United States Patent [19]
Saito et al.

[11] Patent Number: 5,982,592
[45] Date of Patent: Nov. 9, 1999

[54] MAGNETIC TAPE STABILIZER FOR A RECORDING AND PLAYBACK DEVICE

[75] Inventors: Kengo Saito; Ikushi Nakashima; Toshio Kano; Takashi Sato; Shinji Masugi, all of Miyagi, Japan

[73] Assignee: Sony Corporation, Japan

[21] Appl. No.: 08/749,019

[22] Filed: Nov. 14, 1996

[30] Foreign Application Priority Data

| Nov. 20, 1995 | [JP] | Japan | 7-300815 |
| Mar. 4, 1996 | [JP] | Japan | 8-045730 |
| Mar. 11, 1996 | [JP] | Japan | 8-052707 |

[51] Int. Cl.$^6$ .................................................. G11B 15/64
[52] U.S. Cl. ...................................................... 360/130.31
[58] Field of Search .................... 226/196.1; 360/128, 360/130.3–130.33; 242/346–346.2

[56] References Cited

U.S. PATENT DOCUMENTS

| 4,354,686 | 10/1982 | Imanishi et al. | 226/97 |
| 4,427,166 | 1/1984 | Oishi et al. | 226/196.1 |
| 4,472,888 | 9/1984 | Spiller | 226/97 |
| 4,491,891 | 1/1985 | Shiba | 360/130.21 |
| 5,003,423 | 3/1991 | Imamura et al. | 360/130.3 |
| 5,570,831 | 11/1996 | Takeda et al. | 226/196.1 |
| 5,574,606 | 11/1996 | Kimura | 360/130.21 |
| 5,663,845 | 9/1997 | Yamamoto et al. | 360/73.11 |

FOREIGN PATENT DOCUMENTS

| 52-45310 | 4/1977 | Japan | 360/130.31 |
| 58-70453 | 4/1983 | Japan | 360/130.31 |
| 62-149067 | 7/1987 | Japan | 360/130.34 |
| 3-288353 | 12/1991 | Japan . | |

Primary Examiner—Brian E. Miller
Attorney, Agent, or Firm—Ronald P. Kananen; Rader, Fishman & Grauer

[57] ABSTRACT

A recording and playback device utilizing magnetic tape, such as a tape cassette, as a recording medium includes a magnetic head arranged to contact one side of the magnetic tape and a stabilizer arranged positioned directly opposed the magnetic head corresponding to the opposite side of the magnetic tape such that the magnetic tape move along a path interposed between the stabilizer and the magnetic head. The stabilizer includes a tape slider surface in contact with the side of the tape opposite the magnetic head contacting side. Further, the tape slider surface of the stabilizer may be formed with a recessed portion and tape surface scraper portions. According to this structure vibration of the magnetic tape in the vicinity of the magnetic head is greatly reduced such that a head servo for control of the magnetic head may accurately position the magnetic head even in devices utilizing a very small track pitch. Also read/write error, tape dropout, and the like, due to foreign matter entering the tape path, is reliably prevented. Further, space between the magnetic tape and the head is reduced and contact pressure between the head and the tape is maintained to optimize recording and or playback operations between the head and the magnetic tape.

7 Claims, 15 Drawing Sheets

MAGNETIC TAPE STABILIZER FOR A RECORDING AND PLAYBACK DEVICE

BACKGROUND OF THE INVENTION

The present invention relates to a recording and playback device which utilizes magnetic tape as a recording medium.

DESCRIPTION OF THE RELATED ART

Generally, tape recording devices are arranged so as to pass a length of magnetic tape over a magnetic head for accomplishing recording and/or playback operation. FIG. 6 illustrates a major portion of such a conventional recording and playback apparatus. As may be seen in FIG. 6, a length of magnetic tape T travels along a predetermined tape travel path, usually defined by a plurality of guide members (not shown). A magnetic head 31 is arranged between a pair of guides 30 and comes into pressing contact with a surface of the magnetic tape T during tape travel. The magnetic head has a width greater than that of the tape T and is arranged so as to be moveable in the width direction of the tape.

However, according to the above described conventional structure, any vibration of the tape during passage between the guides 30 is easily transmitted to parts adjacent the magnetic head. Such occurrence may easily cause error in recording and/or playback functions.

The magnetic head 31 is disposed so as to be biased into pressing contact with the tape T with sufficient force to hold an appropriate contact state during traveling of the tape T which is formed of a flexible material. Also, in order to assure proper functioning of such a device where the tape T travels at high speed, a substantially strong contact force must be established between the tape T and the head 31.

According to the operation of magnetic tape based recording/playback devices, the magnetic tape T travels a tape path along which it passes over the magnetic head to perform recording or playback of data to and from magnetic tape T. According to the operation of some such devices, a so-called track servo may be employed for operation to move the magnetic head in a lateral or width direction of the tape for playback or recording on a designated portion (i.e. track) of the magnetic tape T.

However, according to the arrangement of such a conventional arrangement as shown in FIG. 6, the means by which the tape T is supported across the magnetic head 31 between a pair of guides 30, 30, any vibration of the tape T in this vicinity is transmitted to structural portions adjacent the magnetic head 31 generally hampering tape playing and recording functions.

The magnetic head 31 is biased into pressing contact with the tape T with sufficient force to assure proper functioning of such a device where the tape T travels at high speed. However, according to the conventional arrangement, the strong contact force established between the tape T and the magnetic head 31 eventually causes damage to both the magnetic tape T and the magnetic head 31. High density recording cannot be maintained as the magnetic coating disposed on the tape T is worn off due to friction with the magnetic head 31, while the continuous motion of the tape T causes severe abrasion of the magnetic head 31, degrading the performance thereof.

Since the width of the magnetic head 31 is relatively large, instability of tape T travel near the magnetic head 31 makes accurate lateral placement of the magnetic head 31 on a specific track portion of the tape T impossible if the pitch of the track is less than 30 micrometers.

Further, high speed travel of the tape T over the magnetic head 31 creates a gap between the tape T and the magnetic head 31 such that short wave recording is impaired and increased linear density of recording operations in inhibited.

Thus, it has been required to provide a tape playback and recording device wherein tape vibration is sufficiently suppressed in the vicinity of the magnetic head 31.

SUMMARY OF THE INVENTION

Thus, it is an object of the present invention to overcome the drawbacks of the related art.

It is a further object of the invention to provide a playback and recording device for magnetic tape in which vibration in the vicinity of the magnetic head is favorably suppressed for facilitating a high level of operational performance while minimizing damage to the magnetic tape and/or the magnetic head.

It is also an object of the invention to provide a magnetic tape playback and recording device having high stability of tape travel over the magnetic head such that highly accurate track servo control is possible, even when a track pitch is very small.

According to one aspect of the invention, there is provided a recording and playback device utilizing magnetic tape as a recording medium, comprising a magnetic head arranged on one side of a magnetic tape and a stabilizer arranged on the opposite side of said magnetic tape in opposed relation to said magnetic head.

According to another aspect of the invention, a recording and playback device is provided, characterized in that a magnetic head is arranged on one side of a magnetic tape and a stabilizer is arranged on the opposite side of the magnetic tape as opposed to the magnetic head, having recessed portions formed within a face of the stabilizer adapted to contact with the tape at a portion upstream of the magnetic head and at a portion downstream of the magnetic head with respect to a direction in which the magnetic tape travels.

Further, according to still another aspect of the invention, there is provided a recording and playback device characterized in that a magnetic head is arranged on one side of a magnetic tape, a stabilizer is arranged on the opposite side of the magnetic tape as opposed to the magnetic head, and a dust cleaner is provided which has a foreign matter scraper surface arranged at generally more than right angles with respect to the other side face of said magnetic tape.

BRIEF DESCRIPTION OF THE DRAWINGS

FIG. 8(a) is a perspective view of another preferred embodiment of the invention, while

FIG. 10(a) represents a state when no recessed portions are provided in a stabilizer while

DESCRIPTION OF THE PREFERRED EMBODIMENT

A preferred embodiment of the invention will be explained below in detail with reference to the drawings. FIGS. 1 and 3 illustrate a first embodiment according to the present invention. FIG. 2(a) is a perspective view of a recording and playback device while FIG. 2(b) shows a plan view thereof.

Figure 2A:
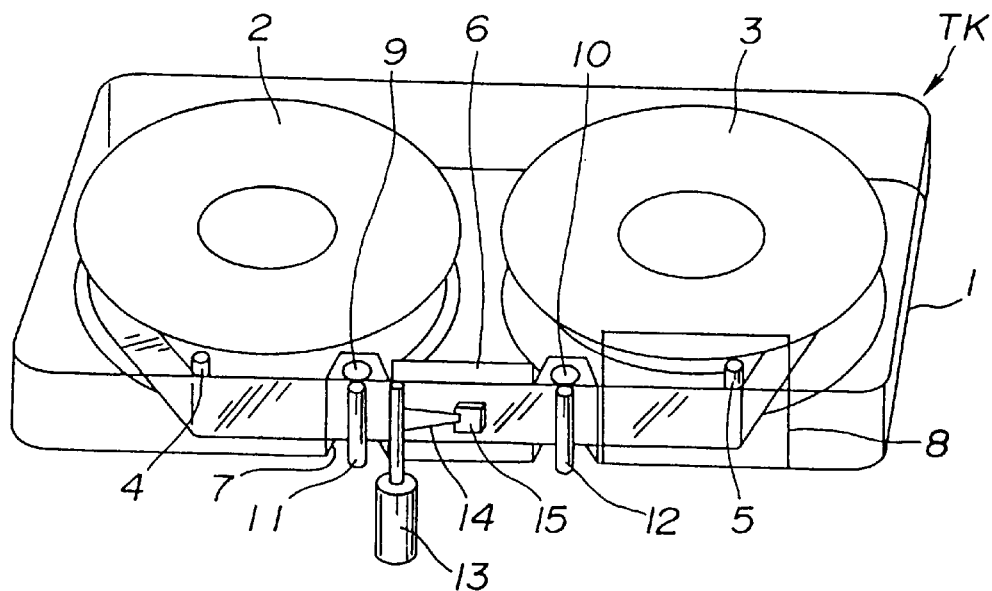
FIGS. 2(a) and (b) are perspective and plan views respectively of a recording and playback device according to a preferred embodiment.
Figure 2B:
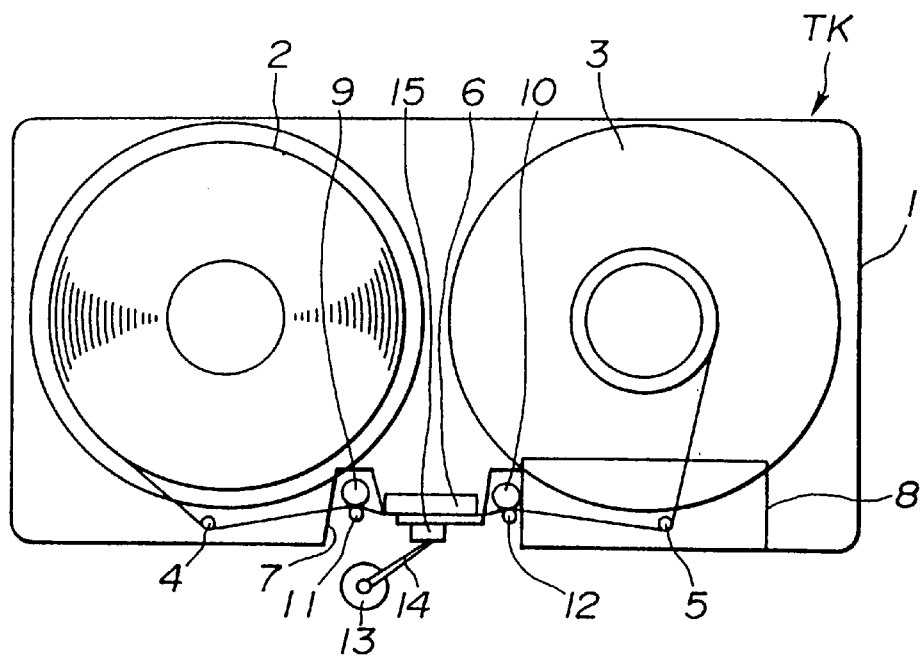
Figure 3:
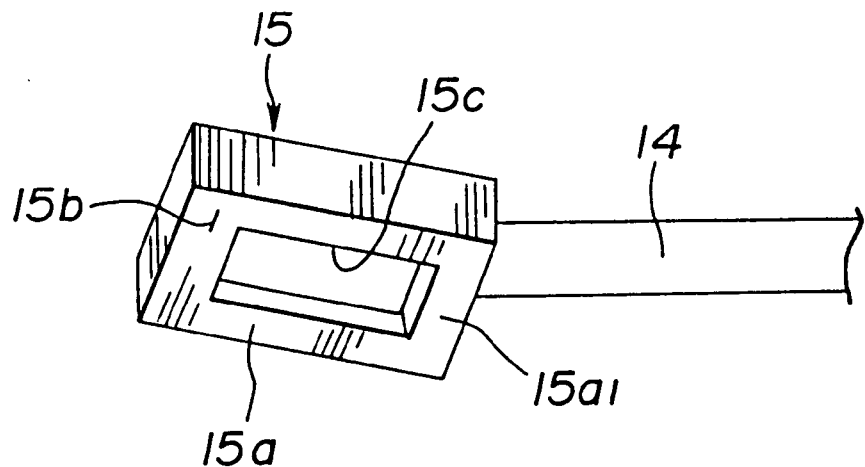
FIG. 3 is a perspective view of a magnetic head.

In FIGS. 2(a) and 2(b), a tape cartridge TK is detachably mounted to a driver (not shown). A pair of reels 2 and 3 are rotatably received within a case 1 of the tape cartridge TK, and a magnetic tape T is wound around the reels 2 and 3 of the pair. A pair of left and right guides 4 and 5 are disposed on one side within the case 1 and a stabilizer (Bernoulli plate) 6 is disposed between the left and right guides 4 and 5 to provide an arrangement wherein the magnetic tape T travels through a tape travel path restrained by the pair of guides 4 and 5 and the stabilizer 6 between the pair of reels 2 and 3.

The case 1 is formed at a central portion on the one side thereof, that is at a portion around the stabilizer 6 with an aperture 7, which aperture 7 is closed by a shutter 8. When the tape cartridge TK is mounted to the driver, the shutter 8 assumes an opened position thereof (FIGS. 2(a), 2(b)), while the shutter 8 otherwise assumes a closed position.

There are provided on the driver side a pinch roller 9 and a capstan 11 pair and another pair of a pinch roller 10 and a capstan 12. These left and right pairs are disposed in the aperture 7 of the loaded tape cartridge. Each pair of the pinch rollers 9, 10 and the capstans 11, 12 are positioned to interpose between the magnetic tape T to have the corresponding one of the capstans 11, 12 drive the magnetic tape T upon selection of recording or playing.

Further, a voice coil motor 13 is fixed to the driver side and has a drive shaft to which a head arm 14 is connected at a base end thereof. Fixed to the head arm 14 at a leading end thereof is a magnetic head 15, and this magnetic head 15 is arranged in press contact with the magnetic tape T at a portion opposite to the stabilizer 6. That is, with the drive force of the voice coil motor 13, the magnetic head 15 is driven to move in the width direction of the tape.

Figure 1A:
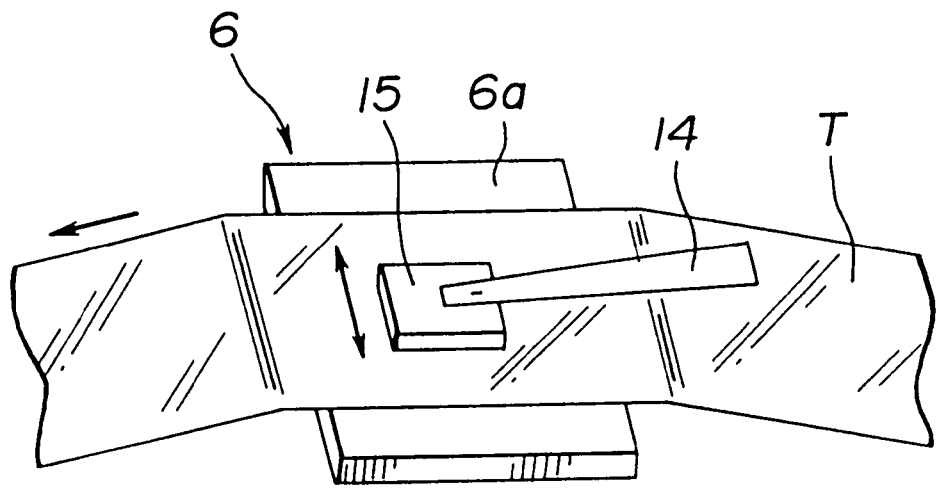
FIGS. 1(a) and (b) respectively show perspective and plan views illustrating an arrangement between a magnetic head and a stabilizer therefor, according to the invention.
Figure 1B:
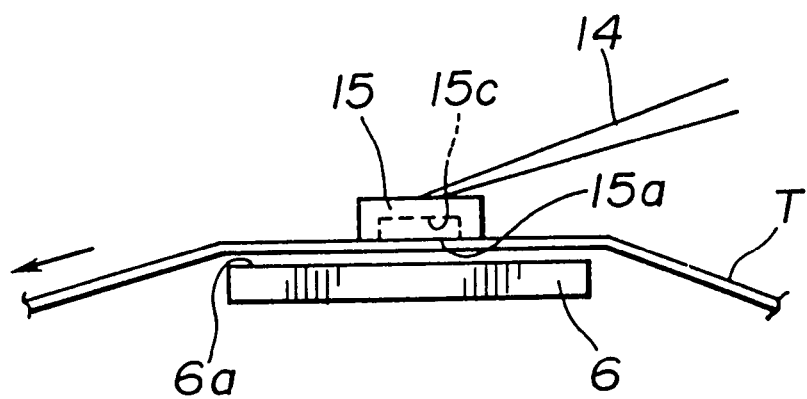

FIGS. 1(a) and 1(b) illustrate detailed construction of the above-mentioned magnetic head 15 and the above-mentioned stabilizer 6. In FIGS. 1(a) and 1(b), the magnetic head 15 is biased into press contact with the magnetic tape T. The biasing force is derived from a spring force on the head arm 14, and the magnetic head 15 has on the face contacting the magnetic tape T a slider surface 15a. As shown in detail in FIG. 3, within the slider surface 15a, there are arranged a head gap 15b as exposed to the tape T and a recess 15c. Although, this recess 15c is disposed at a portion surrounded by the slider surface 15a, it is sufficient to arrange the recess 15c at a portion whose upstream portion with respect to the travel direction of the magnetic tape T is occupied by the slider surface portion 15a. Further, the above-mentioned magnetic head 15 has a width less than the width of the magnetic tape T, ensuring recording or playing of multiple tracks (for example, 100 to 200 tracks) by moving the magnetic head 15 in the tape width direction.

The stabilizer 6 is arranged on the other side of the magnetic tape T in opposed relation with the magnetic head 15. The stabilizer 6 is in the form of a rectangular plate which is hard enough to hold its shape against application of pressure thereto from the magnetic tape T and the magnetic head 15. The corners on the upstream side of the stabilizer 6, with respect to the direction of travel of the magnetic tape T on the face 6a of the stabilizer 6, are orthogonal. This tape contacting face 6a has a very low frictional coefficient.

Next, the operation of the above-mentioned construction is explained. During recording or playing mode, the magnetic tape T is driven to travel according to the rotation of the capstans 10 and 11. During the travel of the magnetic tape T, the magnetic tape T continuously passes over the magnetic head 15 for transmission of record or regenerative signals.

After the magnetic tape T begins to travel, there occurs a flow of air in the vicinity of the magnetic tape T, and this flow of air enters into a space between the magnetic tape T and the stabilizer 6 so that the magnetic tape T travels in a stable manner along the stabilizer to keep pressure induced by this inflow of air constant. If the magnetic tape T moves away from the stabilizer 6 due to vibration of the magnetic tape T or the like, there occurs a drop in pressure between the magnetic tape T and the stabilizer 6, creating a force biasing the magnetic tape T toward the stabilizer 6. If the magnetic tape T moves toward the stabilizer 6, the pressure between the magnetic tape T and the stabilizer 6 increases, inducing a force biasing the magnetic tape T away from the stabilizer 6, resulting in that the magnetic tape T traveling with a constant and very small clearance with the stabilizer 6 as shown in FIG. 1(b). In the main, the magnetic tape T travels to keep the pressure between the magnetic tape T and the stabilizer 6 constant, thus sufficiently suppressing vibration of the magnetic tape at a location where the stabilizer 6 is disposed.

As a result of the arrangement wherein the magnetic head 15 is biased toward the magnetic tape T and the stabilizer 6 is arranged on the opposite side of the magnetic tape T, the magnetic head 15 is held in a general contact state with respect to the traveling of the magnetic tape T. The force on the magnetic head 15 is less than that of the conventional case so that damage applied to the magnetic tape T by the magnetic head 15 is little and abrasion of the magnetic head 15 is little. Due to the provision of the slider surface on the magnetic head and also to the compactness of the magnetic head 15, movement of the magnetic head 15 in the width direction of the magnetic tape T will not produce any substantial force tending to move the magnetic tape T in the width direction thereof, thus applying such a servo to high track density becomes easy.

Air flowing into a space between the magnetic tape T and the slider surface 15a of the magnetic head 15 flows into the recess 15c. The recess 15c has a large volume which creates a vacuum attracting the magnetic head 15 toward the magnetic tape T. That is, although there occurs a lifting force applied to the magnetic head 15 at the slider surface 15a, a force bringing down the magnetic force occurs at the recess 15c; consequently, the magnetic head 15 remains uplifted even when the magnetic tape T travels at high speed. Thus, short wave recording becomes possible, causing an increase in linear recording density.

Figure 4A:
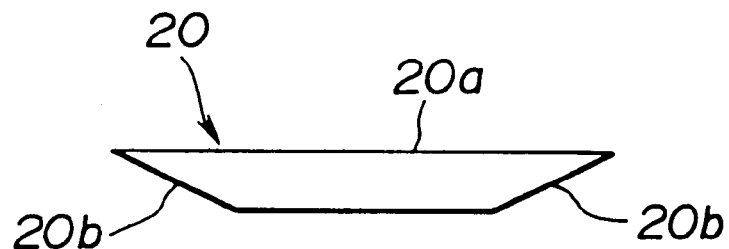
FIGS. 4(a) and (b) are side views respectively showing first and second modifications of a stabilizer according to the invention.
Figure 4B:
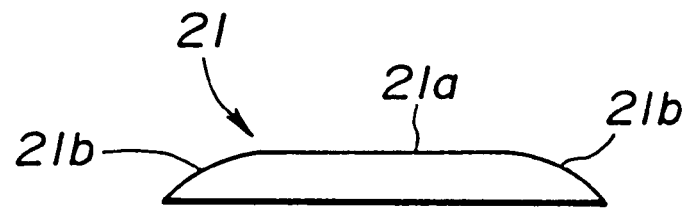

FIGS. 4(a) and 4(b) illustrate first and second modifications 20 and 21 of a stabilizer. The stabilizer 20 shown in FIG. 4(a) is formed with tapered surfaces 20b on the opposite surface of the surface contacting the magnetic tape T at upstream and downstream sides with respect to travel direction of the magnetic tape T. As compared to the above-mentioned embodiment of the stabilizer 6, the amount of air flowing into a space between the magnetic tape T and the stabilizer 20 is less. Thus, this modification is effective if it is desired to reduce the clearance between the magnetic tape T and the stabilizer 20. The stabilizer 21 shown in FIG. 4(b) is formed with tapered surfaces 21b on the surface contacting with the magnetic tape T at upstream and downstream sides with respect to travel direction of the magnetic tape T. As compared to the above-mentioned embodiment of the stabilizer 6, the amount of air flowing into a space between the magnetic tape T and the stabilizer 20 is greater. Thus, this modification is effective if it is desired to increase the clearance between the magnetic tape T and the stabilizer 21.

Figure 5:
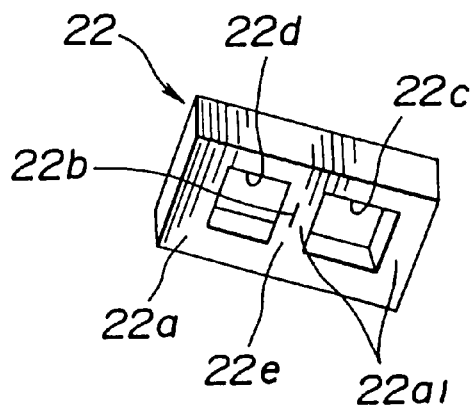
FIG. 5 is a perspective view of a modification of a magnetic head which may be utilized in the device according to the invention.
Figure 6:
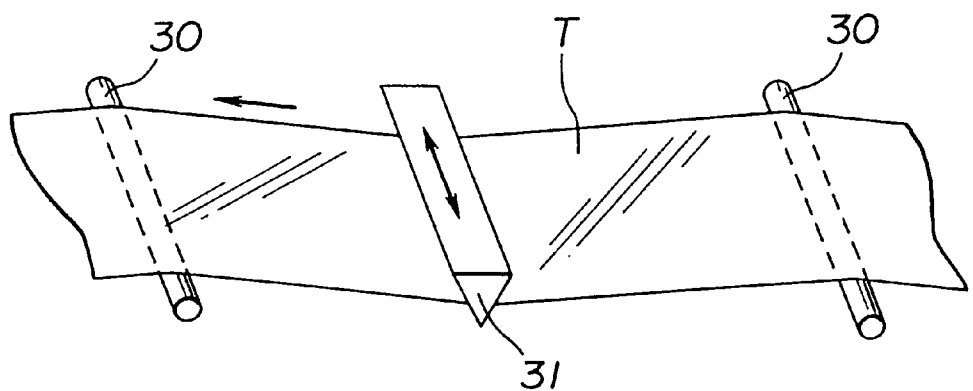
FIG. 6 is a perspective view illustrating a conventional arrangement of a magnetic head in relation to a magnetic tape T during tape operation.

FIG. 5 illustrates a modification of a magnetic head 22. In FIG. 5, the magnetic head 22 is formed with two recesses 22c and 22d within a slider surface 22a and a head gap 22b within a slider surface 22e between these recesses 22c and 22d.

In the previously described embodiment and the modification of the magnetic head 22 that have been illustrated as examples, magnetic heads 15 and 22 are formed with one and two recesses, 15c, 22c and 22d. The number of such recesses may be three or more and may be arranged on any portion as long as a portion of the slider surfaces 15a and 22a exist upstream from each of the recesses.

As described above, according to the present invention, a magnetic head is arranged on one side of a magnetic tape, and a stabilizer is arranged on the opposite side of said magnetic tape in opposed relation to said magnetic head, so that vibration of the magnetic tape is suppressed in the vicinity of the magnetic head and short wave recording with appropriate quality becomes possible.

With the arrangement wherein the magnetic head is biased toward the magnetic tape and the magnetic head is formed with the slider surface on the surface contacting the magnetic tape, the magnetic head is held in general contact with the magnetic tape with less biasing force, so that damage applied to the magnetic tape by the magnetic head is little and abrasion of the magnetic head is little, enabling high density recording and playback in a stable manner over a long period of time. Application of a track servo becomes easy even if the track pitch is small since creation of force tending to move the magnetic tape in the width direction is suppressed during movement of the magnetic head.

As a result of the provision of the recess at a portion whose upstream portion is occupied by a surface portion that constitutes a part of said slider surface, a vacuum builds-up at the recess, that suppresses the lifting of the magnetic head during high speed travel of the magnetic tape, enabling short wave recording with increased linear recording density. As discussed above, the magnetic tape T travels in a manner that keeps the pressure between the magnetic tape T and the stabilizer constant, thus sufficiently suppressing vibration of the magnetic tape at a location where the stabilizer is disposed. According to the arrangement wherein the magnetic head 15 is biased toward the magnetic tape T and the stabilizer 6 is arranged on the opposite side of the magnetic tape T, the magnetic head 15 is held in a general contact state with respect to the traveling magnetic tape T with a bias force less than the conventional case so that damage applied to the magnetic tape T by the magnetic head 15 is little and abrasion of the magnetic head 15 is held small.

Hereinafter, alternative embodiments according to the present invention are described in connection with FIGS. 7 through 13. FIG. 8(a) shows a schematic perspective view of a major part of a recording and playback device while FIG. 8(b) shows a schematic plan view thereof. In FIGS. 8(a) and 8(b), the recording and playback device is composed of a driver and a tape cartridge TK which is removably mounted to a main body of the driver. Within a case 1 of the tape cartridge TK, a pair of reels 2 and 3 are rotatably accommodated and the pair of reels 2 and 3 have a magnetic tape T therearound. Within an area in proximity of one side of the case 1 are provided a pair of left and right guides 4 and 5 and a stabilizer (Bernoulli plate) 6 disposed between guides 4 and 5 for permitting the magnetic tape to travel through a path defined by the pair of guides 4 and 5 and the stabilizer 6.

Further, at a central portion near the one side of the case 1, that is, around the stabilizer 6, there is formed an aperture 7 which is closed or opened by a shutter 8. The shutter 8 assumes its opened position upon loading the main body of the driver, FIG. 8(a) and 8(b), or otherwise assumes its closed position. There are provided at the left side of the driver's side a pinch roller 9 and a capstan 11 set, and on the right side, a pinch roller 10 and a capstan 12 set, such that these left and right sets are disposed within the aperture 7 of the tape cartridge TX mounted on the driver.

The pinch rollers 9, 10 and capstans 11, 12 are selectively moved to a position appropriate for interposing therebetween the magnetic tape T upon recording or playing, thus causing the magnetic tape to travel according to rotation of one of the capstans 11 and 12. Further, on the driver's side, a voice coil motor 13 is fixedly mounted, and a gimbals support plate 14 is fixed to a drive shaft of the voice coil motor 13 as shown in detail in FIGS. 7(a) and 7(b). Fixed to the gimbals support plate 14 are gimbals 16 composed of plate springs, and a magnetic head 15 is fixed to the gimbals 16. The magnetic head 15 is arranged in opposed relation with the stabilizer 6 and in press contact with the magnetic tape T. That is, as a result of the gimbals 16F the magnetic head 15 is held in press contact with the magnetic tape T under the same condition for motion of the magnetic tape T in any of two directions and the magnetic head 15 can move in a width direction of the magnetic tape T due to the drive of the voice coil motor 13.

Figure 7A:
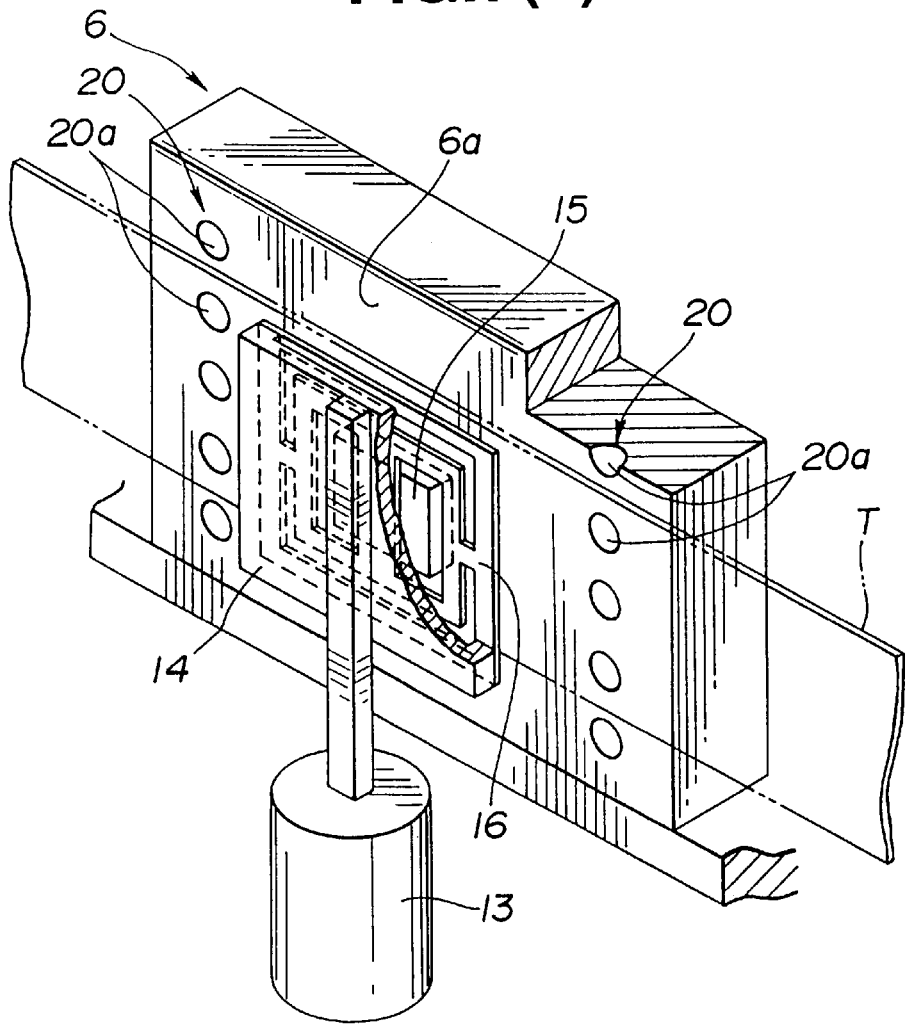
FIGS. 7(a) and (b) are perspective and plan views respectively showing an arrangement of a magnetic head and stabilizer according to a second preferred embodiment of the invention.
Figure 7B:
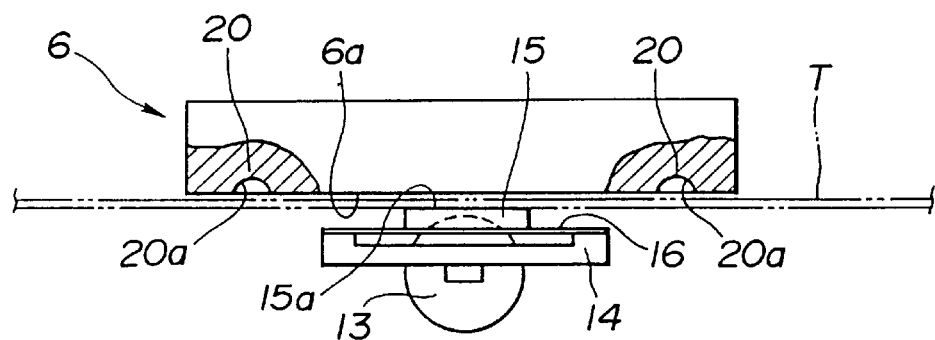
Figure 8A:
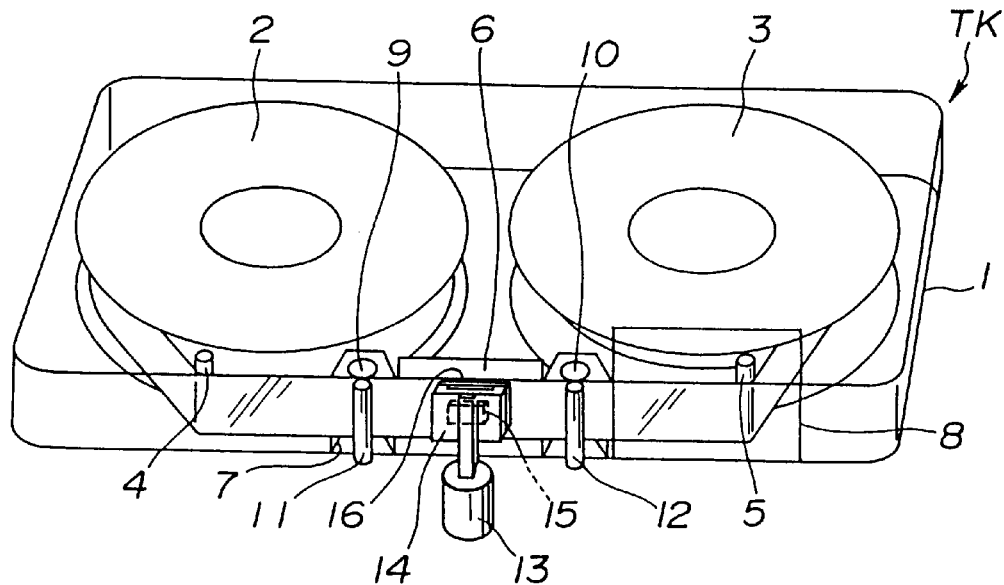
Figure 8B:
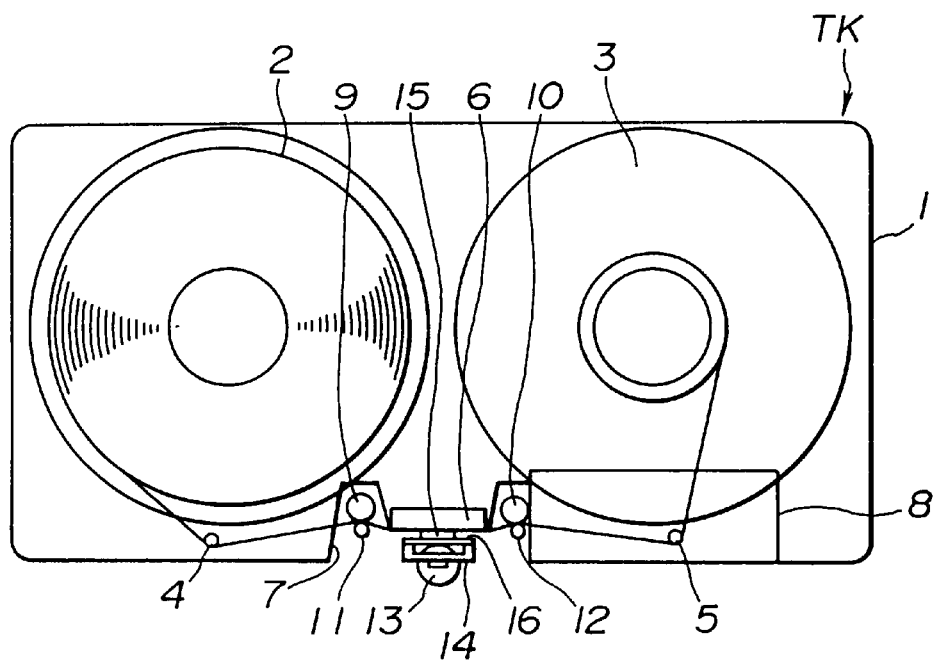
FIG. 8(b) shows a plan view thereof.

FIGS. 7(a) and 7(b) illustrate the detailed structure of the above-mentioned magnetic head 15 and that of the above-mentioned stabilizer 6. In FIGS. 7(a) and 7(b), the magnetic head 15 is arranged to be biased against one face of the magnetic tape T as a result of the biasing force induced by the spring force of the gimbals 16.

Figure 9:
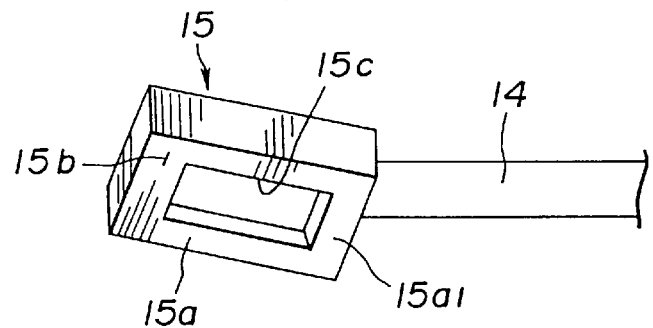
FIG. 9 shows a perspective view of a further embodiment of a magnetic head structure of the invention.

The magnetic head 15 has a slider 15a on its face opposed to the magnetic tape T. As shown in FIG. 9, there are arranged a head gap 15b and a recess 15c within the slider 15a. Although according to this embodiment, the recess 15c is arranged at a portion which is surrounded on each of the four sides by the slider 15a. An alternative arrangement may be had by arranging a recess 15c at a portion which has on an upstream portion, with respect to direction of travel of the magnetic tape T side thereof, a surface 15a that forms a part of the slider 15a. The width of the magnetic head 15 is less than that of the magnetic tape T, and recording and playback over a plurality of tracks (for example 100 to 200 tracks) can be made by moving the magnetic head in the width direction of the magnetic tape T as previously mentioned.

The stabilizer 6 is arranged on the opposite side of the magnetic tape T in opposed relation with the magnetic head 15. This stabilizer 6 is a rectangular plate that has rigidity great enough such that it is not deformed upon application thereto of pressure from the magnetic tape T and the magnetic head 15. The stabilizer 6 has a face bar having a very low frictional coefficient and is adapted to contact with the magnetic tape T. The tape contact face 6a is formed with recessed portions 20 at a portion upstream of the magnetic head 15 and at a portion downstream of the magnetic head 15 with respect to direction in which the tape T travels. Each of these left and right recessed portions 20 is composed of a plurality of rounded recesses 20a arranged in line.

Figure 10A:
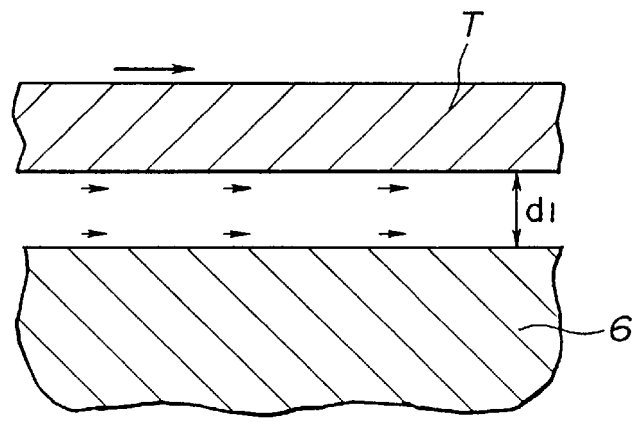
FIGS. 10(a) and (b) are diagrams showing a relational state between a magnetic head and magnetic tape during tape travel.
Figure 10B:
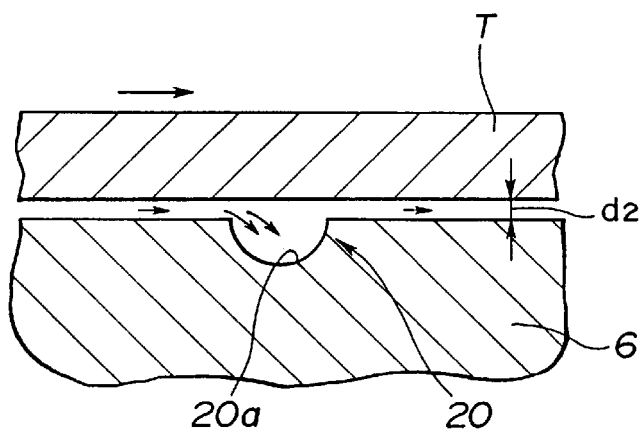
FIG. 10(b) represents a state in which recessed portions are provided in the stabilizer.

Next, operation of the above-mentioned structure is explained. During recording or playing modes, the magnetic tape T travels according to rotation of the capstans 11 and 12. The magnetic tape T passes over the magnetic tape T continuously, conducting transmission of recording signals or playing signals. As the magnetic tape T travels, there occurs an air flow with the magnetic tape T at a portion near the magnetic tape T. This air flow enters between the magnetic tape T and the stabilizer 6, and the magnetic tape T travels to keep the pressure in the air flow constant. If the magnetic tape T moves away from the stabilizer 6 due to vibration of the magnetic tape T or the like, there occurs a drop in pressure between the magnetic tape T and the stabilizer 6, creating a force biasing the magnetic tape T toward the stabilizer 6. If the magnetic tape T moves toward the stabilizer 6, the pressure between the magnetic tape T and the stabilizer 6 increases, inducing a force biasing the magnetic tape T away from the stabilizer 6, and resulting in the magnetic tape T traveling with a constant and very small clearance with the stabilizer 6 as shown in FIG. 7(b). In this manner, the magnetic tape T travels to keep the pressure between the magnetic tape T and the stabilizer 6 constant, thus sufficiently suppressing vibration of the magnetic tape at a location where the stabilizer 6 is disposed. FIG. 10(a) illustrates how the tape travels when a stabilizer 6 formed with no recessed portions are used, while FIG. 10(b) illustrates how the tape travels when a stabilizer formed with a pair of recessed portions 20 are used. As compared to a clearance d1 between the stabilizer 6 and the magnetic tape T, in FIG. 10(a), a clearance d2 between the stabilizer 6 and the magnetic tape T becomes very narrow due to a drop in pressure at the recessed portions 20.

Figure 11A:
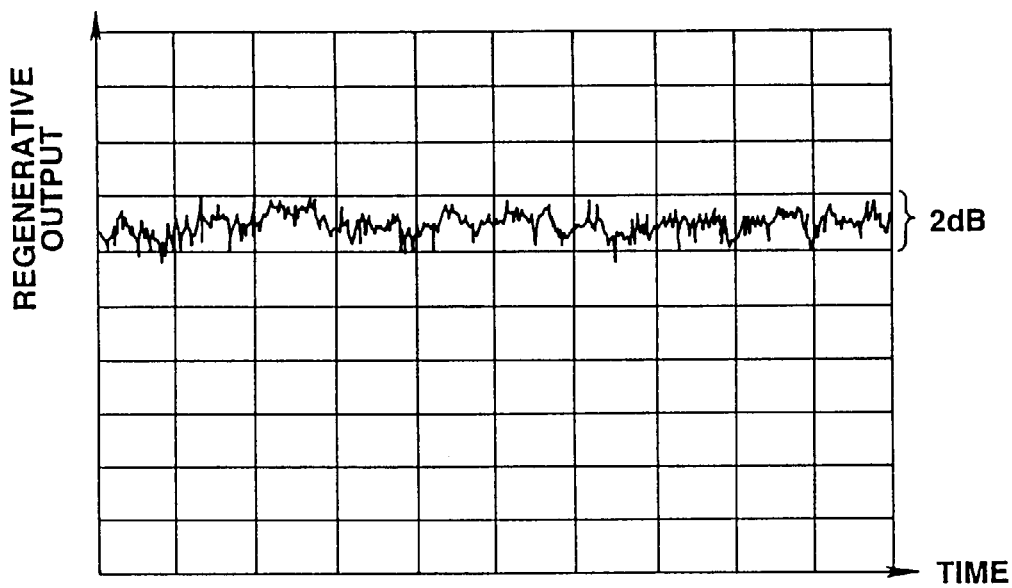
FIGS. 11(a) and (b) are graphs respectively showing RF output characteristics when no recessed portions are provided in the stabilizer and RF output characteristics when recessed portions are provided in the stabilizer.
Figure 11B:
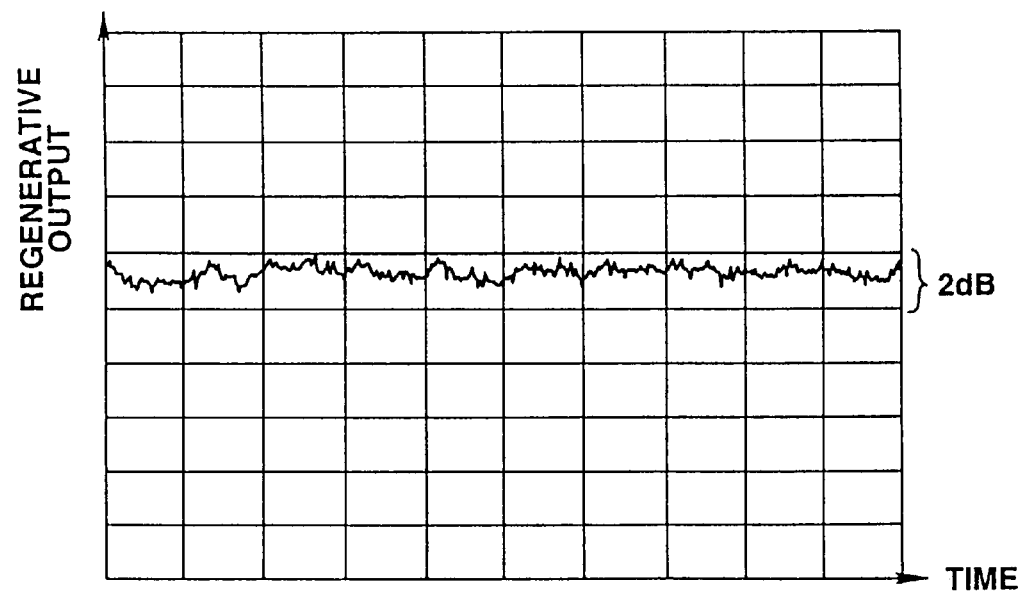

If the tape now travels at a speed of 2 m/sec and the wavelength is 0.8 micrometers, modulation of RF output wave of the above-mentioned magnetic head 15 has resulted in waves as illustrated in FIGS. 11(a) and 11(b), respectively. It is now seen that the modulation is within 2 dB according to the case where the pair of recessed portions are provided and thus less than the case where the pair of recessed portions are not provided.

As a result of the arrangement wherein the magnetic head 15 is biased toward the magnetic tape T and the stabilizer 6 is arranged on the opposite side of the magnetic tape T, the magnetic head 15 is held in a general contact state with respect to the traveling magnetic tape T with a bias force less than the conventional case so that damage applied to the magnetic tape T by the magnetic head 15 is little and abrasion of the magnetic head 15 is little. Due to the provision of the slider surface 15a on the magnetic head 15 and also due to the compactness of the magnetic head 15, movement of the magnetic head 15 in the width direction of the magnetic tape T will not produce any substantial force tending to move the magnetic tape T in the width direction thereof. Thus, application of a servo to high track density becomes easy.

Air entering between the magnetic tape T and the slider surface 15a of the magnetic head 15 flows into the recess 15c with a considerable volume, thus inducing a drop in pressure and attracting the magnetic tape T toward the magnetic head 15. Although the magnetic tape T is subject to lift over the slider 15a, the magnetic tape T is subjected to a downward bias at the recess 15c, resulting in that the magnetic tape T not being substantially lifted. Therefore, it is possible to conduct short wave recording with increased linear recording density.

Figure 12:
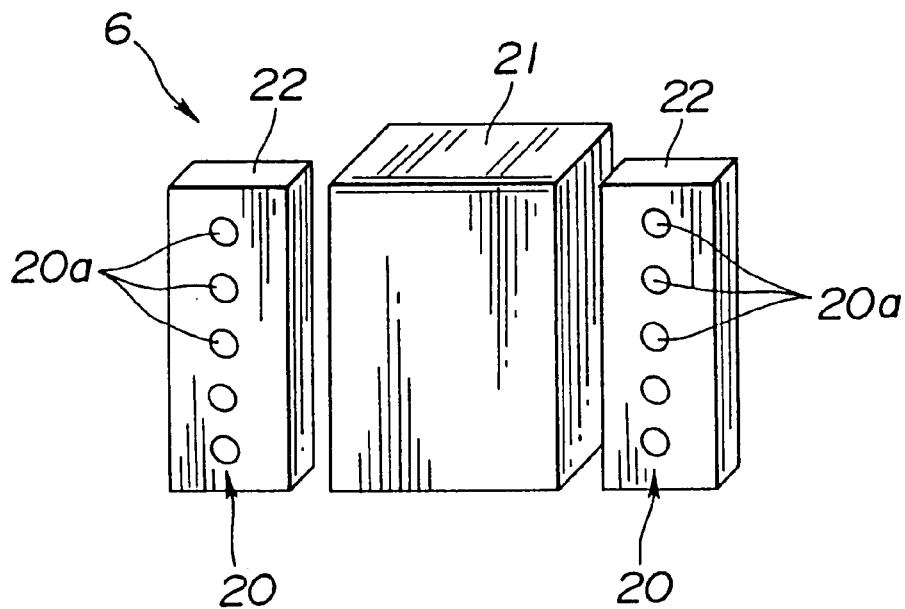
FIG. 12 is a perspective view of a modification of the stabilizer according to the invention.

FIG. 12 is a perspective view of a modified stabilizer 6. In FIG. 12, the modified stabilizer 6 is composed of three components namely a plate member 21 arranged as opposed to the magnetic head 15 and a pair of vacuum induction plates 22. According to this stabilizer 6, the air flow between each of the plates 21 and 22 and the magnetic tape T induces a constant pressure between the stabilizer 6 and the magnetic tape T, and the air flow enters the pair of recessed portions 20 and causes a drop in pressure between the pair of vacuum induction plates 22 and the magnetic tape T so that the magnetic tape T can travel along the stabilizer 6 with a small clearance with respect to the stabilizer 6.

Figure 13:
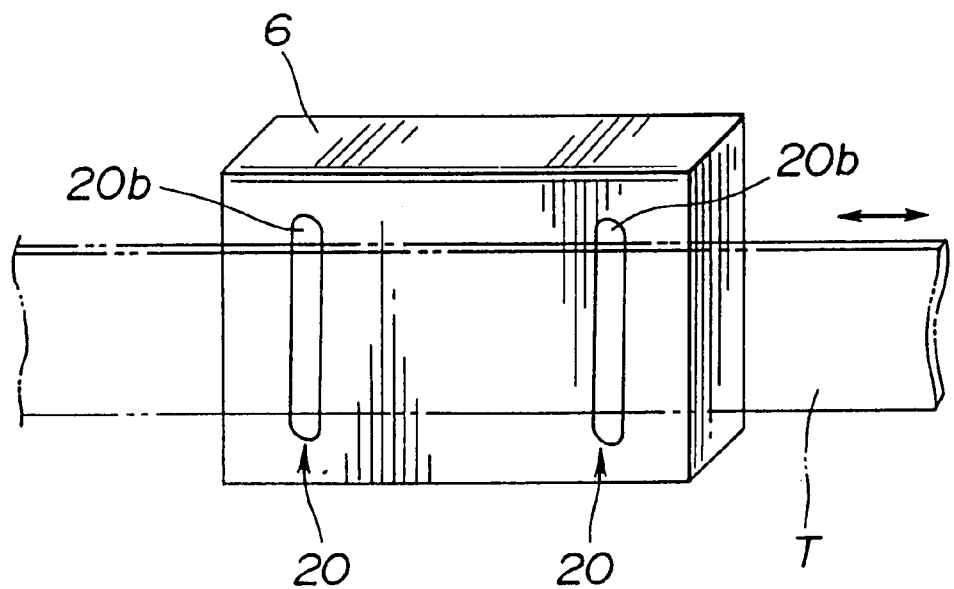
FIG. 13 is a perspective view of the stabilizer modification of FIG. 12 wherein recessed portions are also provided.

FIG. 13 is a perspective view of a modification of stabilizer 6 provided with modified recessed portions 20. In FIG. 13, each of the recessed portions 20 is in the form of an elongated groove 20b arranged in juxtaposed relation with respect to a direction in which the magnetic tape T travels. This modified stabilizer 6 provides substantially the same function and effect as those of the previous embodiments.

The recessed portions 20 may take a form other than the above-mentioned plurality of rounded recesses 20a and elongated grooves as long as they allow entrance of air flow. According to the present invention, as previously described, a magnetic head 15 is arranged on one side of a magnetic tape T, and a stabilizer 6 is arranged on the opposite side of said magnetic tape T. The stabilizer 6 is arranged in opposed relation to said magnetic head 15. The recessed portions 20 are formed at a portion within a face of the stabilizer 6 adapted to contact with the magnetic tape T upstream of the magnetic head 15 and at a portion downstream of the magnetic tape T. Given this arrangement, the magnetic tape T can travel along the stabilizer with a small clearance with respect to the stabilizer 6 such that vibration of the tape at a portion adjacent the magnetic head 15 is suppressed sufficiently.

According to a recording and playback device which accomplishes the task, a magnetic head 15 is arranged on one side of a magnetic tape T, a stabilizer 6 is arranged on the opposite side of the magnetic tape T as opposed to the magnetic head 15. A dust cleaner is provided which has a foreign matter scraper surface arranged at generally more than right angles with respect to the opposite side face of said magnetic tape T. As the magnetic tape T travels, there occurs air flowing with the magnetic tape T at a portion near the magnetic tape T. This air flow enters between the magnetic tape T and the stabilizer 6, and the magnetic tape T travels to keep the pressure between the magnetic tape T and the stabilizer 6 constant, thus sufficiently suppressing vibration of the magnetic tape T at the location where the stabilizer 6 is disposed. Besides foreign matter adhered to the other side of the magnetic tape T being scraped away by a dust cleaner, the dust cleaner 12 is disposed upstream of the magnetic head 15, thus preventing entry of foreign matter into a space between the magnetic tape T and the stabilizer 6.

Figure 15A:
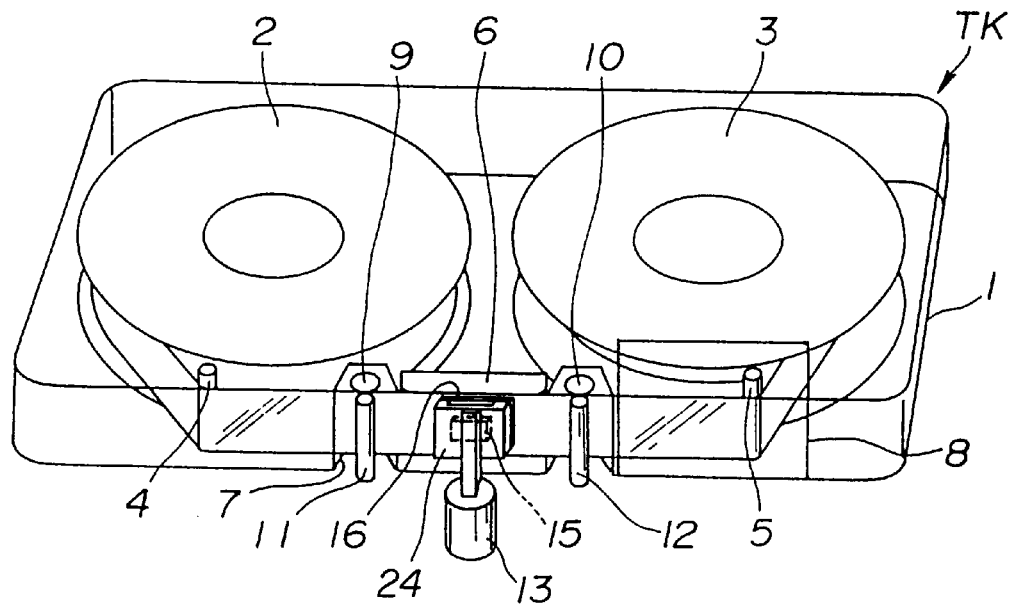
FIGS. 15(a) and (b) respectively show a general perspective view and a plan view of the third embodiment.
Figure 15B:
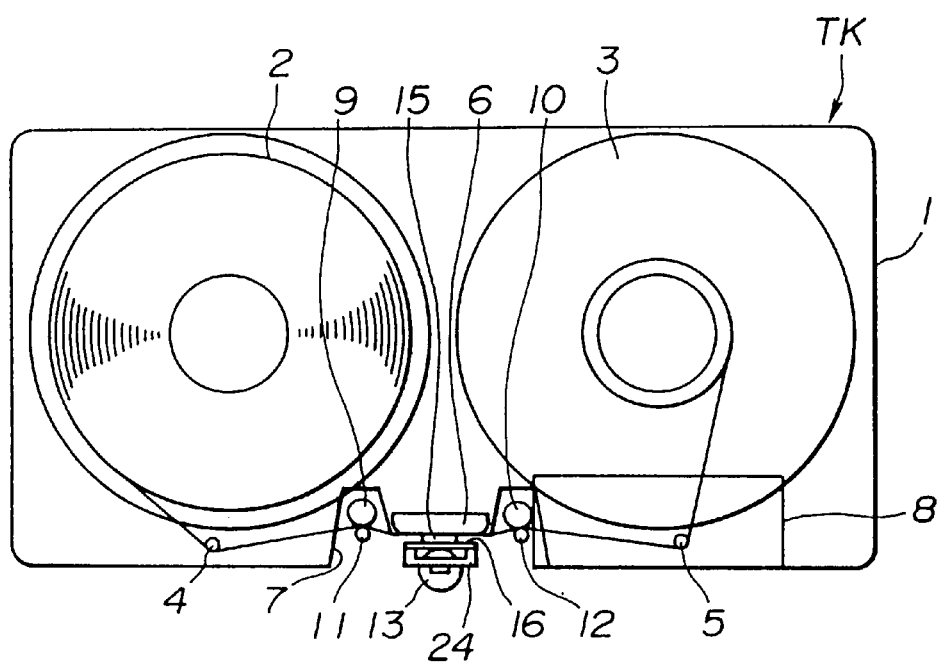

Hereinafter, alternative embodiments according to the present invention are described in connection with the drawings. FIG. 15(a) shows a schematic perspective view of a major part of a recording and playback device, while FIG. 15(b) shows a schematic plan view thereof. In FIGS. 15(a) and 15(b), the recording and playback device is composed of a driver and a tape cartridge TK which is removably mounted to a main body of the driver. Within a case 1 of the tape cartridge TK, a pair of reels 2 and 3 are rotatably accommodated and the pair of reels 2 and 3 have a magnetic tape T therearound. Within an area in proximity of one side of the base 1, are provided a pair of left and right guides 4 and 5 and a stabilizer 6 (Bernoulli plate) disposed between the guides 4 and 5 for permitting the magnetic tape T to travel through a path defined by the pair of guides 4 and 5 and the stabilizer 6.

Further, at a central portion near the one side of the case that surrounds the stabilizer 6, there is formed an aperture 7, which is closed or opened by a shutter 8. The shutter 8 assumes its opened position upon loading the main body of the driver (FIGS. 8(a) and 8(b)) or otherwise assumes its closed position.

There are provided on the driver's side a left side set including a pinch roller 9 and a capstan 11, and a right set comprised of a pinch roller 10 and a capstan 12. These left and right sets are disposed within the aperture 7 of the tape cartridge TK mounted to the driver. The sets of pinch rollers 9, 10 and capstans 11, 12 are selectively moved to a position appropriate for interposing therebetween the magnetic tape T upon recording or playing, thus causing the magnetic tape T to travel according to the rotation of one of the capstans 11 and 12.

Figure 14A:
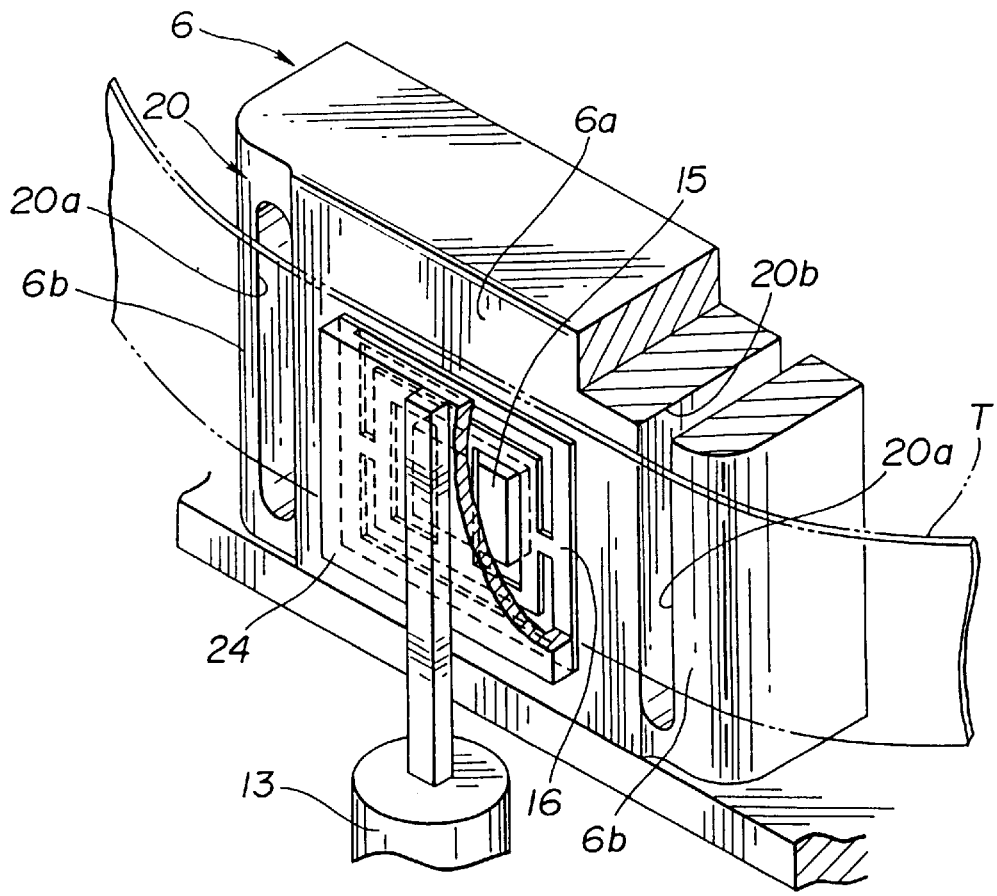
FIGS. 14(a) and (b) are perspective and plan views respectively showing an arrangement of a magnetic head and stabilizer according to a third preferred embodiment of the invention.
Figure 14B:
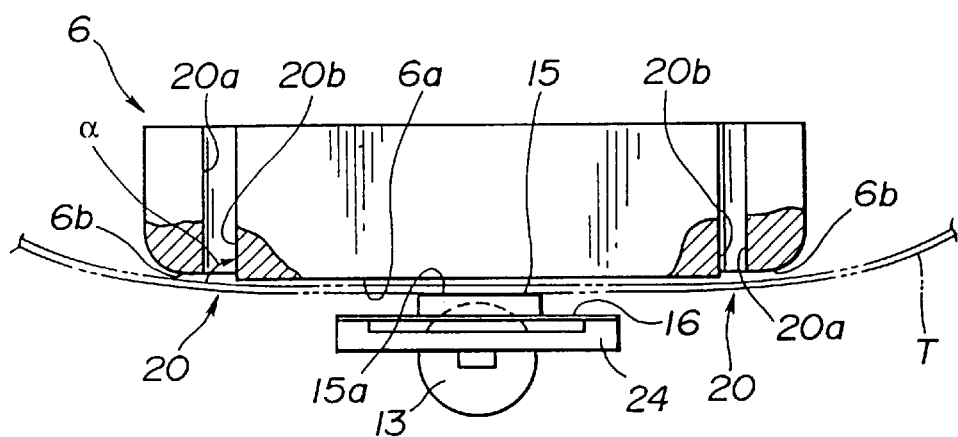

Further, on the driver's side, a voice coil motor 13 is fixedly mounted, and a gimbals support plate 24 is fixed to a drive shaft of the voice coil motor 13, as shown in detail in FIGS. 14(a) and 14(b). Fixed to this gimbals support plate 24 are gimbals 16 composed of plate springs, and a magnetic head 15 is fixed to the gimbals 16. The magnetic head 15 is arranged in opposed relation with the stabilizer 6 and in press contact with the magnetic tape T. As a result of the gimbals 16, the magnetic head 15 is held in press contact with the magnetic tape T under the same condition for motion of the magnetic tape T in any one of two directions, and the magnetic head 15 can move in a width direction of the magnetic tape T as a result of drive of the voice coil motor 13.

Figure 16:
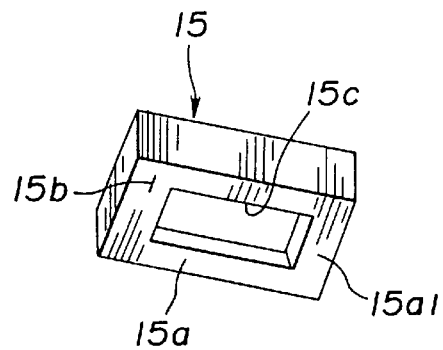
FIG. 16 shows a perspective view of an alternative magnetic head structure according to the invention.

FIGS. 14(a) and 14(b) illustrate the detailed structure of the above-mentioned magnetic head 15 and that of the above-mentioned stabilizer 6. In FIGS. 14(a) and 14(b) the magnetic head 15 is arranged to be biased against one face of the magnetic tape T as a result of a biasing force induced by the spring force of the gimbals 16, and the magnetic head 15 has a slider 15a on its face opposed to the magnetic tape T. As shown in FIG. 16, there are arranged a head gap 15b and a recess 15c within the slider 15a. Although, according to this embodiment, the recess 15c is arranged at a portion which is surrounded on each of the four sides of the slider 15a so as to arrange a recess 15c at a portion which has an upstream side with respect to the direction of travel of the magnetic tape T which forms a part of the slider 15a. The width of the magnetic head 15 is less than that of the magnetic tape T, and recording and playing over a plurality of tracks (for example, 100 to 200 tracks can be made by moving the magnetic head 15 in the width direction of the magnetic tape T as previously mentioned).

The stabilizer 6 is arranged on the opposite side of the magnetic tape T in opposed relation with the magnetic head 15. This stabilizer 6 comprises a rectangular plate that has a rigidity great enough not to be deformed upon application thereto of pressure from the magnetic tape T and the magnetic head 15. The stabilizer 6 has a face 6a, adapted to contact with the magnetic tape T, said face 6a having a very low frictional coefficient.

A dust cleaner 20 results from forming apertures 20a through the stabilizer 6 at a portion upstream with respect to a direction in which the magnetic tape T travels on the magnetic head 15 and another portion downstream on the magnetic head 15 respectively, and has a foreign matter scraper surface 20b in the form of the aperture defining surface inclined at more than right angles with respect to the other side face of the magnetic tape T.

Besides, the stabilizer 6 is recessed from the tape as compared to the central surface 6a adapted to contact with the tape and rounded at edge portion of the apertures 20a. As a result of this arrangement, there is prevented an occurrence of tape damage, even if the magnetic tape T is subjected to vibrations since the tape contacts smoothly with the stabilizer 6.

Next, operation of the above-mentioned structure is explained. During recording or playing mode, the magnetic tape T travels according to the rotation of the capstans 11 and 12. The magnetic tape T, traveling, passes over the magnetic head 15 continuously conducting transmission of recording signals or playing signals. As the magnetic tape T travels, there occurs air flowing with the magnetic tape T at a portion near the magnetic tape T, this air flow enters between the magnetic tape T and the stabilizer 6, and the magnetic tape T travels to keep pressure in the air flow constant.

If the magnetic tape T moves away from the stabilizer 6 due to vibration of the magnetic tape T or there occurs a drop in pressure between the magnetic tape T and the stabilizer 6, creating a force biasing the magnetic tape T toward the stabilizer 6 if the magnetic tape T moves toward the stabilizer 6, the pressure between the magnetic tape T and the stabilizer 6 increases. This action induces a force that biases the magnetic tape T away from the stabilizer 6, resulting in the magnetic tape T traveling with a constant and very small clearance with the stabilizer 6 as shown in FIG. 14(b). In this manner, the magnetic tape T travels to keep the pressure between the magnetic tape T and the stabilizer 6 constant thus sufficiently suppressing vibration of the magnetic tape at a location where the stabilizer 6 is disposed.

As a result of the arrangement wherein the magnetic head 15 is biased toward the magnetic tape T and the stabilizer 6 is arranged on the opposite side of the magnetic tape T, the magnetic head 15 is held in a general contact state with respect to the traveling magnetic tape T with a bias force less than the conventional case so that damage applied to the magnetic tape T by the magnetic head 15 is little and abrasion of the magnetic head 15 is little. Due to the provision of the slider surface 15a and the magnetic head 15 and also to the compactness of the magnetic head 15, movement of the magnetic head 15 in the width direction of the magnetic tape will not produce any substantial force tending to move the magnetic tape T in the width direction thereof. Thus, application of such a servo to high track densities also becomes easy.

Air entering between the magnetic tape T and the slider 15a of the magnetic head 15 flows into the recess 15c with a considerable volume, thus inducing a drop in pressure, thus attracting the magnetic tape T toward the magnetic head 15. That is, although the magnetic tape T subject to lift over the slider 15a, the magnetic tape T is subjected to a downward bias at the recess 15c, resulting in the magnetic tape T not being substantially lifted. Therefore, it is possible to conduct short wave recording with increased linear recording density.

If foreign matter 29 (such as dust) is adhered to the other side surface of the magnetic tape T (the surface facing the stabilizer 6), this foreign matter 29 comes into collision with the foreign matter scraper surface 20b to be scraped away when the foreign matter has a size greater than a clearance between the magnetic tape T and the stabilizer 6. Thus, the occurrence of drop-out of playing signal is prevented since the magnetic head 15 is not biased via the magnetic tape T by the foreign matter 29.

Figure 17A:
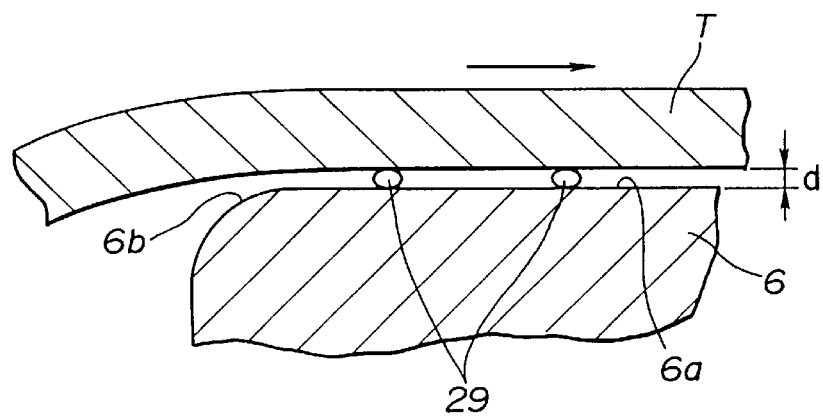
FIGS. 17(a) and (b) are diagrams respectively showing a state in which no dust cleaner portion is provided with a stabilizer and a state in which a dust cleaner portion is provided with the stabilizer.
Figure 17B:
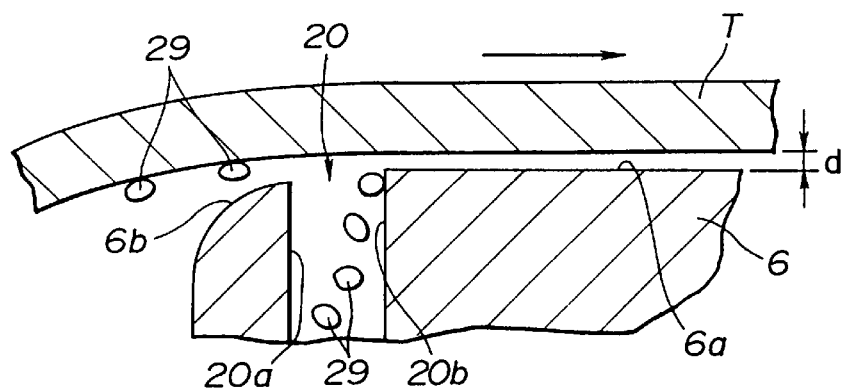
Figure 18:
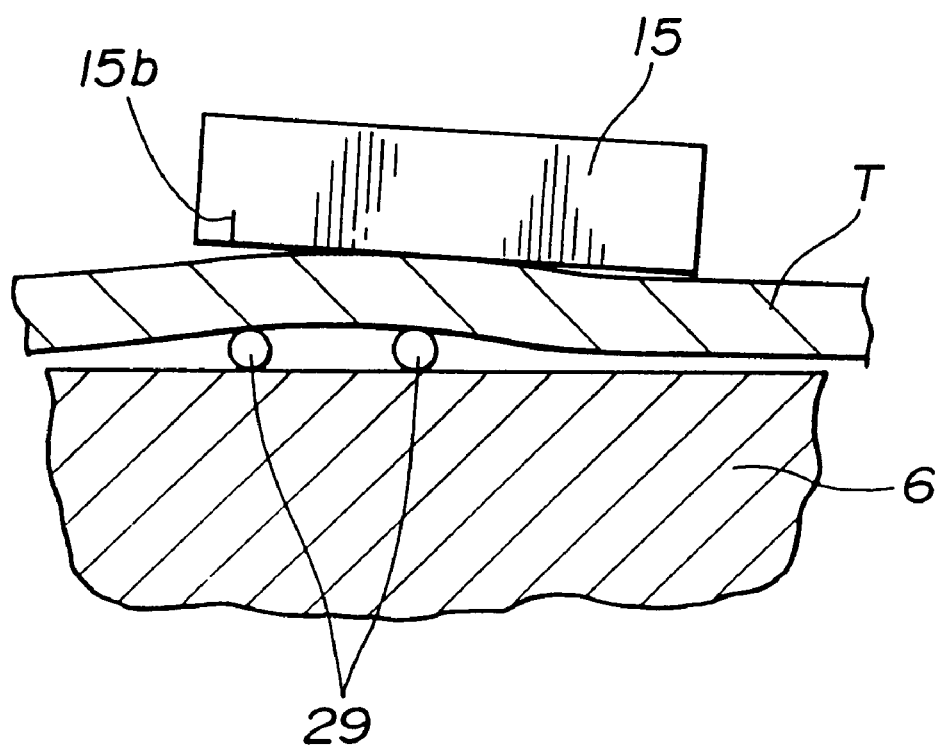
FIG. 18 illustrates a state in which a gap is induced between the magnetic tape and the magnetic head due to the introduction of foreign matter along the tape path in the vicinity of the magnetic head.

FIG. 17(a) illustrates the state wherein the tape T travels if the stabilizer 6 without dust cleaner is used, while FIG. 17(b) illustrates the state wherein the tape T travels if the stabilizer 6 with dust cleaner is used. In FIG. 17(a), if foreign matter 29 is adhered to the magnetic tape T on that side surface facing the stabilizer 6, this foreign matter 29 is guided by rounded corners 6b of the stabilizer 6 into a space between the magnetic tape T and the stabilizer 6, even if the size of the foreign matter 29 is greater than a clearance "d" between the magnetic tape T and the stabilizer 6. Then, as shown in FIG. 5, the magnetic tape T is deformed as a result of foreign matter inserted between the magnetic tape T and the stabilizer 6, and this deformation of the magnetic tape T alters the position of the magnetic head 15. This causes occurrence of space between the magnetic tape T and the magnetic head 15, resulting in occurrence of drop-out in playing signal.

Specifically, if the wave length of recording is less than 0.8 micrometers, particularly in the neighborhood of 0.5 micrometers, there occurs drop-out due to space created by foreign matter 29 disposed between the magnetic tape T and the magnetic head 15.

In FIG. 17(b) as described above, foreign matter 29 with a size greater than the clearance "d" is scraped away by the foreign matter scraper surface 20b and thus foreign matter with a size less than the clearance "d" only is allowed to enter into a space between the magnetic tape T and the stabilizer 6. Since foreign matter with a size less than the clearance "d" will not cause any deformation of the tape T, no drop-out in the playing output of the magnetic head 15 will be induced.

Figure 19A:
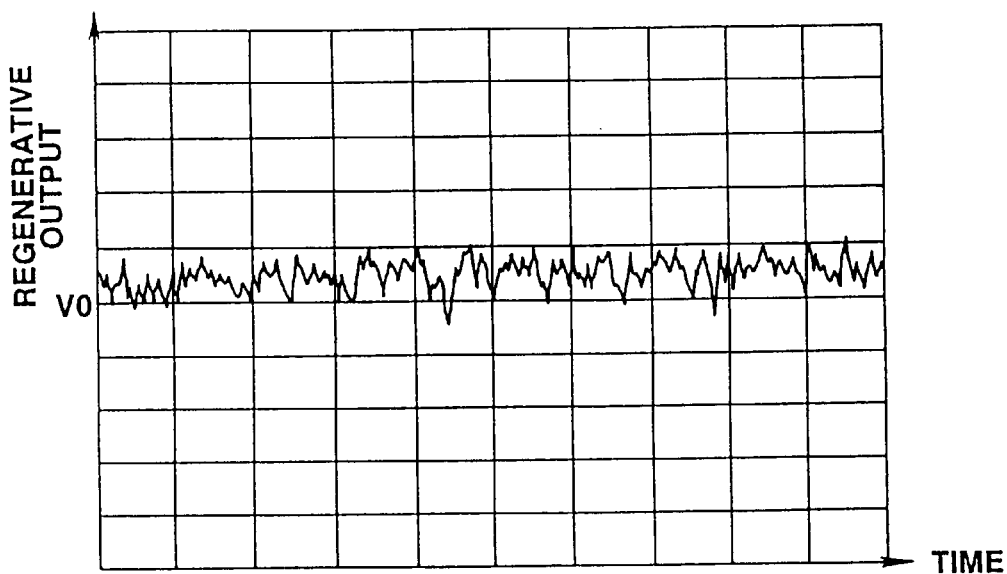
FIGS. 19(a) and (b) are graphs respectively showing RF output characteristics when no recessed portions are provided in the stabilizer and RF output characteristics when recessed portions are provided in the stabilizer.
Figure 19B:
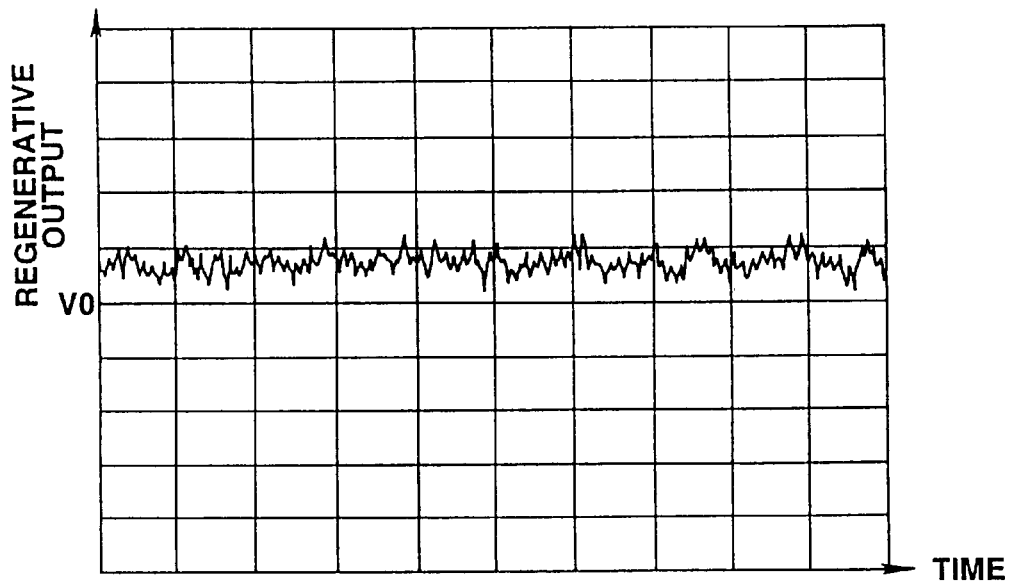

When comparing the state shown in FIG. 17(a) with the state shown in FIG. 17(b), a wave form as illustrated in FIG. 19(a) and that as illustrated in FIG. 19(b) are obtained. As shown in FIG. 19(b), if the dust cleaner 20 is not used, RF wave form always stays above a preset level VO. While as shown in FIG. 19(a), if the dust cleaner 20 is not used, RF wave form drops below the preset level VO, inducing drop-out.

Figure 20A:
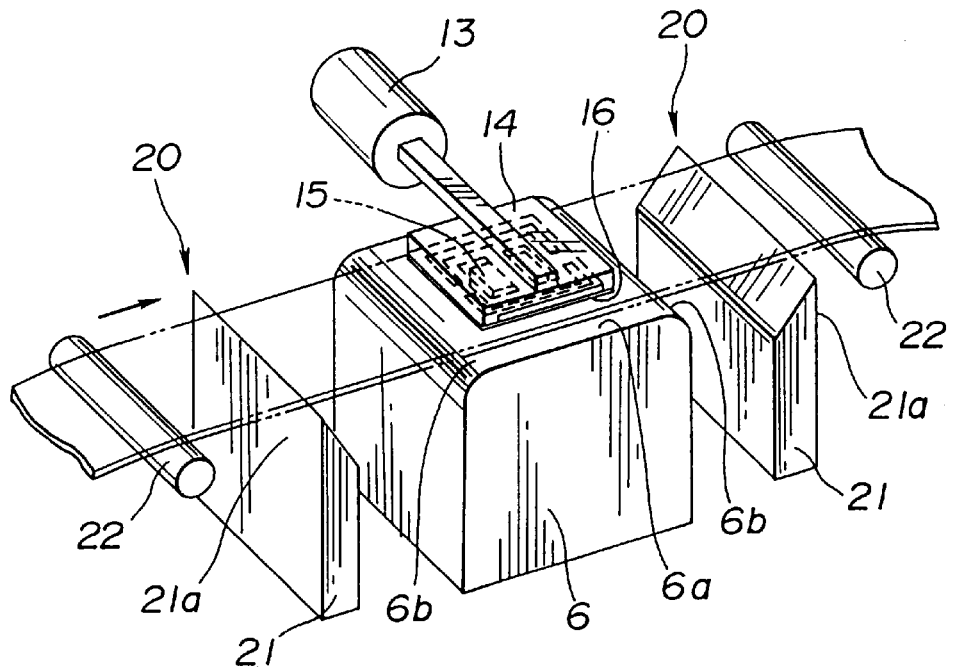
FIGS. 20(a) and (b) respectively show perspective and plan views of a modification of a dust cleaner portion according to the third embodiment.
Figure 20B:
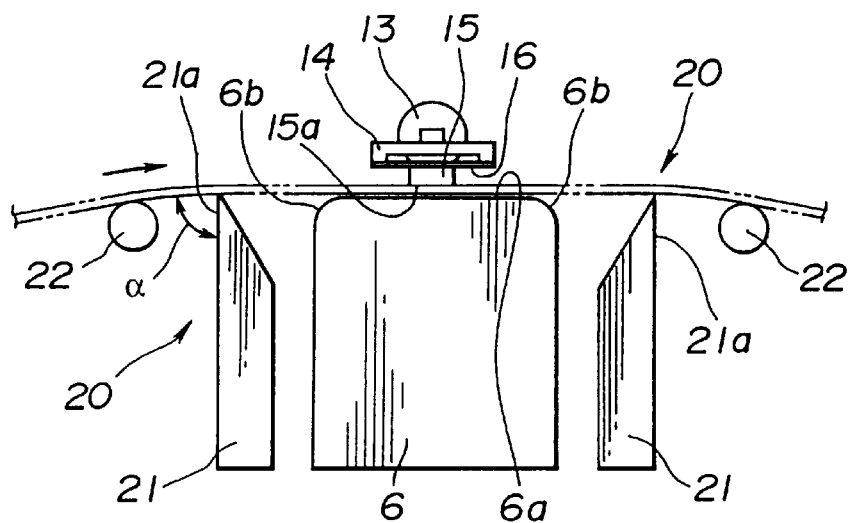

FIGS. 20(a) and 20(b) illustrate a second embodiment according to the present invention. In FIGS. 20(a) and 20(b), a magnetic head 15 is arranged on one side of a magnetic tape T and a stabilize 6 is arranged on the other side of the magnetic tape T in opposed relation with the magnetic head 15a. This stabilizer 6 is formed with rounded corners 6b on the opposite edges of a side surface 6a of the stabilizer 6 adapted to contact with the magnetic tape T.

A dust cleaner 20 includes a pair of cleaner members 21 arranged on the opposite sides of the stabilizer 6 in spaced relation therewith, each of the cleaner members 21 being provided with a foreign matter scraper surface 21a angled at generally right angles with respect to the other side face of the magnetic tape T. Specifically, the pair of cleaner members 21 are disposed upstream and downstream of the magnetic head 15 with respect to a direction in which the magnetic tape T travels.

Arranged outside the pair of cleaner members 21 are a pair of tape guides 22. Due to this pair of tape guides 22, the magnetic tape T, even if it vibrates, can keep smooth contact with the cleaner members 21, avoiding damage to the tape T.

According to the above-mentioned construction, if foreign matter is adhered to the other side face (the side facing the stabilizer 6) of the magnetic tape T, this foreign matter comes into collision with the foreign matter scraper surface 20b of one of the cleaner members 21 which is disposed upstream with respect to a direction in which the tape T travels. According to this second embodiment, a leading edge of the foreign matter scraper surface 21a contacts with the magnetic tape T. It is possible to scrape away foreign matter with a size smaller that that of foreign matter that is to be scraped away in the case of the previous embodiment.

Although, in the present and previous embodiment, the dust cleaner 20 has foreign matter scraper surfaces 20b and 20a disposed upstream and downstream of the magnetic head 15 with respect to the direction in which the tape travels, it is sufficient to arrange such foreign matter scraper surface on the upstream side of the magnetic head 15 only in the case where recording and playback can be conducted by moving the tape in one direction only.

Although, in the first and second embodiments, an angle alpha through which each of the foreign matter scraper surfaces makes with the tape (see FIG. 14(b) and FIG. 20(b)) is generally at a right angle, this angle may exceed the right angle.

According to the present invention, a magnetic head 15 is arranged on one side of a magnetic tape T, a stabilizer is arranged on the opposite side of the magnetic tape as opposed to the magnetic head and a dust cleaner 20 is provided which has a foreign matter scraper surface arranged at generally more that right angles with respect to the other side face of said magnetic tape T so that vibration of the magnetic tape T is suppressed sufficiently due to the use of the stabilizer 6 and occurrence of drop-out due to foreign matter is prevented.

The present invention is not limited only to the description as herein disclosed but may be modified and embodied in other way without departing from the scope or inventive concept of the invention as set forth above.

What is claimed:

1. A recording and playback device for magnetic tape, comprising:

a magnetic head arranged on one side of a magnetic tape, the magnetic head being biased into press contact with the magnetic tape, and a stabilizer arranged on an opposite side of the magnetic tape opposed to the magnetic head, wherein the stabilizer includes a face surface that defines at least one recessed portion, said recessed portion creating a vacuum that draws the magnetic tape toward the recessed portion causing the tape to contact the stabilizer at a location upstream of the magnetic head and at a portion downstream of the magnetic head with respect to a direction in which the magnetic tape travels.

2. A recording and playback device as claimed in claim 1, wherein the magnetic head is biased toward said magnetic tape and includes a slider on that side which contacts with said magnetic tape.

3. A recording and playback device as claimed in claim 1, wherein said stabilizer is composed of three members including a plate arranged opposed to the magnetic head and a pair of vacuum conduction plates, wherein each conducting plate forming the pair of conduction plates defines at least one recessed portion in a face thereof.

4. A recording and playback device as claimed in claim 2, wherein said stabilizer is composed of three members including a plate arranged on an opposite side of the magnetic tape opposed to the magnetic head and a pair of vacuum induction plates, wherein each conducting plate forming the pair of conduction plates defines at least one recessed portion in a face thereof.

5. A recording and playback device as claimed in claim 1, wherein said recessed portions are in the form of rounded recesses.

6. A recording and playback device as claimed in claim 1, wherein said recessed portions are elongated grooves arranged in juxtaposed relation with respect to a direction in which the magnetic tape travels.

7. A recording and playback device for magnetic tape as set forth in claim 1, further comprising:

a dust cleaner having a foreign matter scraper surface arranged at generally more than right angles with respect to said opposite side of the magnetic tape.

* * * * *